May 19, 1953     D. A. HOWARD ET AL     2,639,008
WHEEL BLOCK AND CHOCK

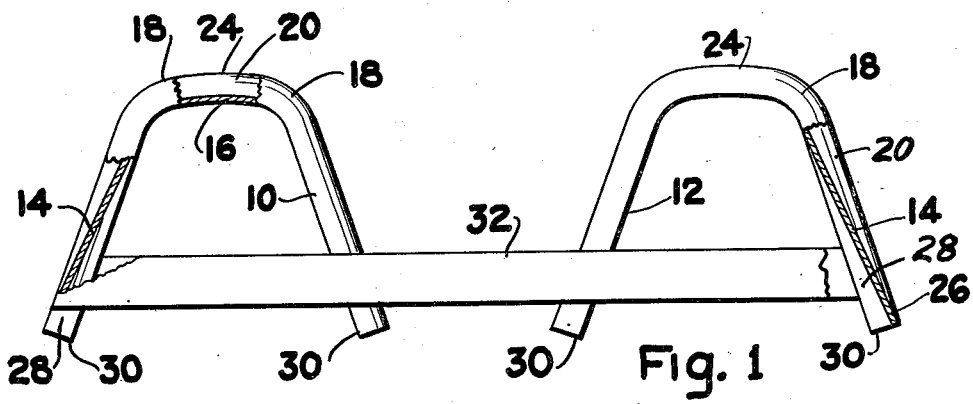
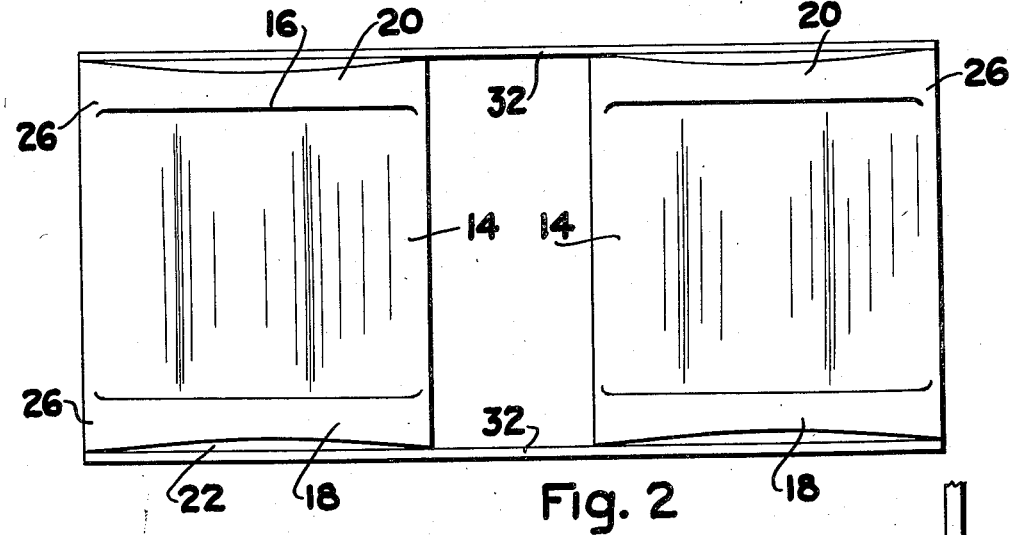
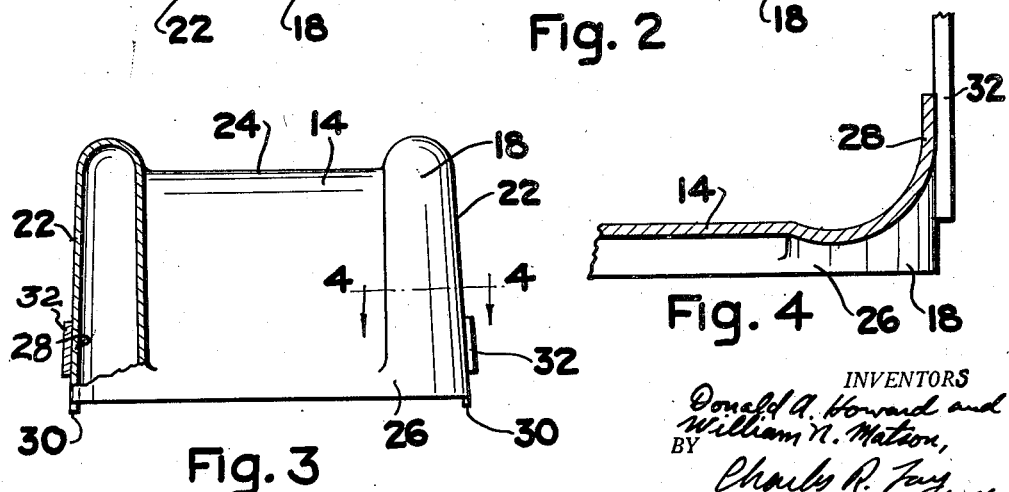

Filed March 10, 1950     2 Sheets-Sheet 2

INVENTORS
Donald A. Howard and
William N. Matson
BY Charles R. Fay, atty.

Patented May 19, 1953

2,639,008

UNITED STATES PATENT OFFICE 2,639,008

WHEEL BLOCK AND CHOCK

Donald A. Howard, Worcester, and William N. Matson, Fitchburg, Mass.

Application March 10, 1950, Serial No. 148,766

4 Claims. (Cl. 188—32)

This invention relates to new and improved wheel blocking and chocking devices and the principal object of the invention resides in the provision of an improved block and chock providing maximum strength with minimum weight and amount of material commensurate with maximum strength and effectiveness; the provision of a chock which may be used either in front or in back of any wheel and at the same time may be used to support a wheel; the provision of a device as stated comprising a pair of upstanding bearing elements which are spaced to provide for supporting a wheel thereon, the wheel circumference extending relatively longitudinally of the device and transversely across the two upstanding elements, the latter having ribs at the edges thereof preventing lateral motion of the tire thereon; and the provision of a device as stated wherein said elements are provided with tapering sides which will pack down yielding material such as mud and snow and thus resist sinking even though bearing a heavy weight, as of a vehicle.

A further object of the invention resides in the provision of a block or chock comprising a pair of inverted, truncated, V-shaped, trough-like members secured together in spaced parallel relation and providing between them a wheel chock or blocking up device of minimum weight and maximum strength and at the bottom presenting a series of sharp edges which dig into any surface on which the device is positioned, the apices of the V's which point upwardly being rounded off on a large radius giving a large bearing surface to the wheel or tire supported thereon.

Other objects and advantages of the invention will appear hereinafter.

Reference is to be had to the accompanying drawings in which

Fig. 1 is a view in side elevation of a device according to the invention, parts being in section and broken away;

Fig. 2 is a top plan view thereof;

Fig. 3 is an end view in elevation; parts being in section;

Fig. 4 is an enlarged section on line 4—4 of Fig. 3;

Figure 5:
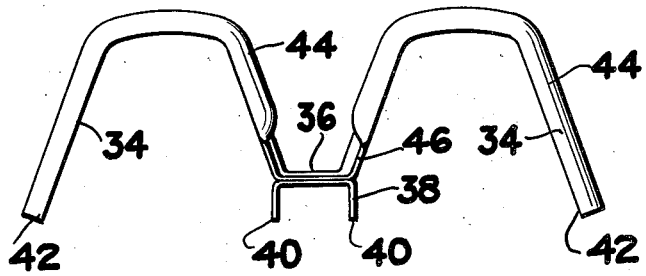
Fig. 5 is a view in side elevation of a modified construction.

The form of the invention shown in Figs. 1, 2 and 3 comprises a pair of separate and spaced inverted truncated V-shaped trough-like members generally indicated at 10 and 12, these members being exactly alike and each comprising a web portion 14 extending from side to side of the device transversely thereof. It is preferred that the webs 14 are provided with a 3-inch radius at the top as at 16 so as to prevent damage to the tire resting thereon by giving a large bearing surface therefor.

At the ends of the troughs or webs 14, the same are provided with rounded, upstanding ribs, 18, 20 and the edges thereof flare outwardly in a downward direction as shown at 22 in Figs. 2 and 3. This provides for stacking the device.

The relationship between the ribs 18 and 20 and the connecting webs 14 is such that the upstanding ribs are at a maximum at the top or bearing surfaces 24 and taper downwardly relative to the webs 14 as clearly shown in Fig. 1 so that the ribs disappear at the outside aspects of the webs as at 26 and merge into the contours of the webs 14; however, the ribs extend down below said webs providing flat side surfaces below the webs 14 as at 28.

These flat "rib" members provide depending sharp points 30 which dig into the ground or snow and prevent slipping of the block when weight is applied thereon. These flats also provide good welding surfaces for securing the connecting side members 32.

The side members 32 convert the two separate devices into a single double block. The angles of the sides of the webs 14 have been selected for maximum strength, particularly for resistance to downward forces as well as the inclined forces which would be exerted thereon when the devices are used as chocks. Also, the truncated, V-shape of the trough-like webs 14 will pack down snow and mud so as to resist sinking, and the points 30 of which there are eight, will, of course, dig into any kind of surface, particularly ice, to resist displacement in any direction. The bottom of the trough-like members are curved and lie on arcs of circles the centers of which lie below the points 30, i. e., at points below the surface on which the device rests, to provide a rounded support for pneumatic tires that will not injure the same under any conditions.

Figure 6:
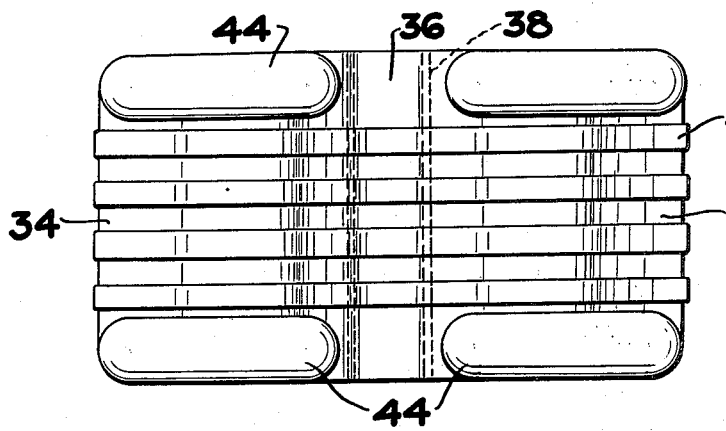
Fig. 6 is a top plan view thereof.

Essentially the same device may be constructed in another manner as illustrated in Figs. 5 and 6 wherein a single piece of material is formed into the equivalent of the pair of troughs as generally indicated at 34. However, these troughs are connected centrally as at 36 because the original blank was a single sheet. The connection 36 may extend downwardly to the ground level, but it is preferred that an extra inverted channel iron 38 be utilized to form feet 40 to dig into the supporting surface for the device and these, together with the sharp edges 42, will resist any kind of slipping due to pressure thereon in any direction.

Ribs 44 may be provided, similar to those of the device shown in Fig. 1, and also smaller ribs 46 may be impressed both to strengthen the device and to provide further against sidewise slipping. The advantages of the device of Figs. 5 and 6 reside in the fact that it uses less pieces and less welds or other fastening means, and also that the welds between the channel iron 38 and the center portion 36 of the device are in compression so that there is less likelihood of failure.

Figure 7:
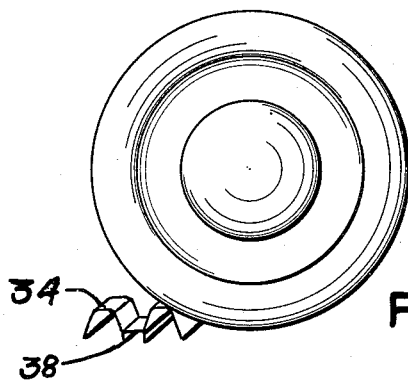
Figs. 7, 8 and 9 are illustrative of some of the uses of the device.
Figure 8:
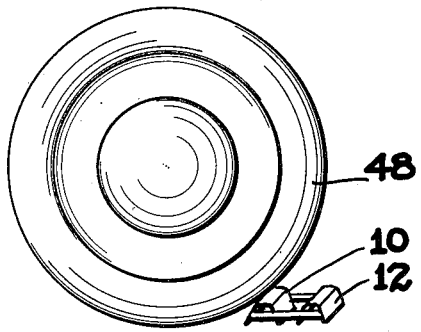

In Fig. 7 there is shown a wheel 48 which is chocked by the device at one side thereof and Fig. 8 shows the same wheel chocked at the opposite side. When one wheel only is jacked up, the device may be set at an angle to resist displacement in the direction of greatest strain.

Figure 9:
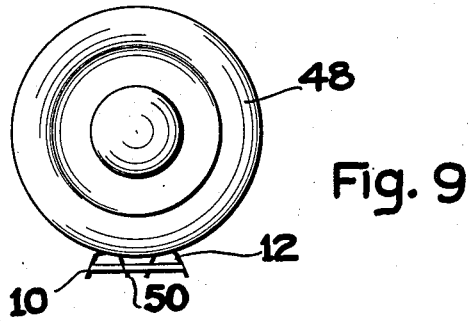

Fig. 9 shows a wheel being supported by the device and it is clear that it is extremely easy to run the wheel up on this chock both because it is relatively low and because of the particular angles of the web portions thereof. In this condition, tire chains, for instance, are very easily applied because it is possible to place the chains over the device with one of the cross chains occupying the center channel position indicated at 50, so that the chains are actually free of the chock but located underneath the wheel and the ends thereof can then be easily draped over the wheel and connected together. The tire does not pinch the chain and therefore provides easy tightening of the entire chain.

It is to be particularly noted that the ribbed construction of both forms of the invention provides against sidewise slip of the wheel off of the chock. Especially in cases where a single wheel is raised by a jack, a component of force tends to move the wheeled vehicle laterally, and such slippage, prevented by the present chock, frequently takes place where a plain block is used.

Having thus described our invention and the advantages thereof, we do not wish to be limited to the details herein disclosed otherwise than as set forth in the claims, but what we claim is:

1. A device of the class described comprising a pair of spaced inverted trough-like members secured in fixed relation to each other and having sloping sides, relatively sharp pointed elements at the widest parts of the trough-like members to dig into a ground surface when weight is applied to the device, the bottoms of the troughs being uppermost and relatively broad to support a tired wheel without damage thereto, and upstanding ribs at the edges of the troughs, said ribs diminishing in height from the trough bottoms toward the widest parts thereof and terminating in sharp ended, laterally flat areas forming the said sharp pointed elements.

2. A device of the class described comprising a pair of spaced inverted trough-like members secured in fixed relation to each other and having sloping sides, relatively sharp pointed elements at the widest parts of the trough-like members to dig into a ground surface when weight is applied to the device, the bottoms of the troughs being uppermost and relatively broad to support a tired wheel without damage, and an inverted channel iron secured to the adjacent edges of the members and forming a center support.

3. A device of the class described comprising a pair of spaced inverted trough-like members secured in fixed relation to each other and having sloping sides, relatively sharp pointed elements at the widest parts of the trough-like members to dig into a ground surface when weight is applied to the device, the bottoms of the troughs being uppermost and relatively broad to support a tired wheel without damage thereto, upstanding ribs at the edges of the troughs, said ribs diminishing in height from the trough bottoms toward the widest parts thereof and terminating in sharp-ended, laterally flat areas forming the said sharp pointed elements, and a bar secured to the said flat areas, connecting the trough-like members, and spacing the same.

4. A device of the class described comprising a pair of spaced inverted trough-like members secured in fixed relation to each other and having sloping sides, relatively sharp pointed elements at the widest parts of the trough-like members to dig into a ground surface when weight is applied to the device, the bottoms of the troughs being uppermost and relatively broad to support a tired wheel without damage thereto, upstanding ribs at the edges of the troughs, said ribs lying at a slight angle relative to the sloping sides and extending along the edges of said sloping sides, and said ribs diminishing at one side thereof and gradually increasing at the other side of said sloping sides from the trough bottoms toward the widest parts thereof, said ribs terminating in sharp-ended flat coplanar areas forming the said sharp pointed elements.

DONALD A. HOWARD.
WILLIAM N. MATSON.

References Cited in the file of this patent

UNITED STATES PATENTS

| Number | Name | Date |
| --- | --- | --- |
| 1,465,852 | Lane | Aug. 21, 1923 |
| 2,332,993 | Davis | Oct. 26, 1943 |
| 2,441,627 | Gregg | May 18, 1948 |
| 2,465,551 | Otterness | Mar. 29, 1949 |
| 2,521,539 | Richardson | Sept. 5, 1950 |

FOREIGN PATENTS

| Number | Country | Date |
| --- | --- | --- |
| 205,322 | Great Britain | Oct. 18, 1923 |